US012441021B2

(12) United States Patent
Torrenga

(10) Patent No.: US 12,441,021 B2
(45) Date of Patent: Oct. 14, 2025

(54) BLADE ASSEMBLY AND COUNTERWEIGHT MECHANISM FOR A HIGH-SPEED FOOD SLICING APPARATUS, AND METHODS ASSOCIATED WITH THE SAME

(71) Applicant: Provisur Technologies, Inc., Chicago, IL (US)

(72) Inventor: Ryan Michael Torrenga, Bourbonnais, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 452 days.

(21) Appl. No.: 18/045,904

(22) Filed: Oct. 12, 2022

(65) Prior Publication Data

US 2023/0127251 A1 Apr. 27, 2023

Related U.S. Application Data

(60) Provisional application No. 63/271,459, filed on Oct. 25, 2021.

(51) Int. Cl.
*B26D 7/06* (2006.01)
*B26D 1/00* (2006.01)
(Continued)

(52) U.S. Cl.
CPC ......... *B26D 7/2614* (2013.01); *B26D 1/0006* (2013.01); *B26D 1/06* (2013.01);
(Continued)

(58) Field of Classification Search
CPC ...... B26D 7/2614; B26D 7/01; B26D 7/0608; B26D 7/0625; B26D 7/0633;
(Continued)

(56) References Cited

U.S. PATENT DOCUMENTS 2,036,012 A 3/1936 Bellinghausen
2,347,818 A 5/1944 Folk
(Continued)

FOREIGN PATENT DOCUMENTS

AU 200111314 A1 5/2001
AU 2013202066 A1 10/2013
(Continued)

OTHER PUBLICATIONS

Extended European search report issued in connection with EP application No. EP24176143.6 dated Oct. 09, 1 2024, 9 pages.
(Continued)

*Primary Examiner* — Omar Flores Sanchez
(74) *Attorney, Agent, or Firm* — KLINTWORTH & ROZENBLAT LLP

(57) ABSTRACT

A food slicing system includes a hub fixedly secured to a drive shaft and configured to rotate with the drive shaft. The hub has a central pilot projection coaxial with the drive shaft, and flat, blade contacting surface surrounding the pilot projection. A counterweight is eccentrically mounted to the hub and rotatable between a first position and an second position relative to the hub. Wherein when the counterweight is in a first position, the counterweight is in axial alignment with pilot projection, and permits the blade to be attached to or removed from the hub via movement of the blade in the axial direction. When the counterweight is in the second position, the counterweight is eccentric to the pilot projection and is offset from the axis of rotation, to provide a predetermined amount of weight offset from the axis of rotation to counterbalance the weight of the blade.

18 Claims, 9 Drawing Sheets

(51) Int. Cl.
*B26D 1/06* (2006.01)
*B26D 5/00* (2006.01)
*B26D 5/22* (2006.01)
*B26D 5/42* (2006.01)
*B26D 7/01* (2006.01)
*B26D 7/26* (2006.01)
*B26D 7/32* (2006.01)
*B26D 1/28* (2006.01)
*B26D 7/00* (2006.01)

(52) U.S. Cl.
CPC ............... *B26D 5/007* (2013.01); *B26D 5/22* (2013.01); *B26D 5/42* (2013.01); *B26D 7/01* (2013.01); *B26D 7/0608* (2013.01); *B26D 7/0625* (2013.01); *B26D 7/0633* (2013.01); *B26D 7/0641* (2013.01); *B26D 7/32* (2013.01); *B26D 2001/0013* (2013.01); *B26D 2001/0046* (2013.01); *B26D 1/28* (2013.01); *B26D 2007/0018* (2013.01); *B26D 2210/02* (2013.01)

(58) Field of Classification Search
CPC ...... B26D 7/0641; B26D 7/32; B26D 1/0006; B26D 1/28; B26D 5/007; B26D 5/22; B26D 5/42; B26D 2001/0013; B26D 2001/0046; B26D 2007/0018; B26D 2210/02
See application file for complete search history.

(56) References Cited

U.S. PATENT DOCUMENTS

| | | | |
|---|---|---|---|
| 2,714,574 | A | 8/1955 | Kearney |
| 3,080,784 | A | 3/1963 | Schneider |
| 3,105,433 | A | 10/1963 | Yerex et al. |
| 3,179,039 | A | 4/1965 | Christensen |
| 3,667,521 | A | 6/1972 | Beasley |
| 3,842,260 | A | 10/1974 | Christensen et al. |
| 3,846,958 | A | 11/1974 | Divan |
| 3,892,156 | A | 7/1975 | Johnstone |
| 3,894,457 | A | 7/1975 | Miller et al. |
| 3,901,140 | A | 8/1975 | Dohm, Jr. |
| 3,982,299 | A | 9/1976 | Kompan |
| 3,990,336 | A | 11/1976 | Soodalter |
| 4,119,004 | A | 10/1978 | Ludwig |
| 4,179,985 | A | 12/1979 | Baker et al. |
| 4,196,561 | A | 4/1980 | Kruse |
| 4,557,019 | A | 12/1985 | Van Devanter et al. |
| 4,651,384 | A | 3/1987 | Korhonen |
| 4,815,919 | A | 3/1989 | Juravic |
| 4,962,568 | A | 10/1990 | Rudy et al. |
| 4,967,652 | A | 11/1990 | Mally |
| 5,048,719 | A | 9/1991 | Empl et al. |
| 5,054,345 | A | 10/1991 | Weber |
| 5,056,648 | A | 10/1991 | Huber et al. |
| 5,064,667 | A | 11/1991 | Mally |
| 5,117,717 | A | 6/1992 | Mally |
| 5,146,827 | A | 9/1992 | Komatsu et al. |
| 5,152,208 | A | 10/1992 | Ruetschle et al. |
| 5,186,090 | A | 2/1993 | Bunch, Jr. |
| 5,201,259 | A | 4/1993 | Covert et al. |
| 5,241,887 | A | 9/1993 | Wolff et al. |
| 5,249,491 | A | 10/1993 | Carter |
| 5,267,168 | A | 11/1993 | Antonissen et al. |
| 5,271,304 | A | 12/1993 | Wygal et al. |
| 5,314,375 | A | 5/1994 | O'Brien et al. |
| 5,324,228 | A | 6/1994 | Vogeley, Jr. |
| 5,334,084 | A | 8/1994 | O'Brien et al. |
| 5,343,791 | A | 9/1994 | Julian et al. |
| 5,410,954 | A | 5/1995 | Wygal et al. |
| 5,423,250 | A | 6/1995 | Anderson et al. |
| 5,423,657 | A | 6/1995 | Frost et al. |
| 5,429,548 | A | 7/1995 | Long et al. |
| 5,431,935 | A | 7/1995 | Carey |
| 5,470,274 | A | 11/1995 | Kadi et al. |
| 5,481,466 | A | 1/1996 | Carey |
| 5,482,166 | A | 1/1996 | Brown |
| 5,580,599 | A | 12/1996 | Fehr |
| 5,668,634 | A | 9/1997 | Newman |
| 5,720,593 | A | 2/1998 | Pleake |
| 5,727,997 | A | 3/1998 | Dufour et al. |
| 5,784,937 | A | 7/1998 | Wygal et al. |
| 5,832,802 | A | 11/1998 | Warthen et al. |
| 5,902,177 | A | 5/1999 | Tessier et al. |
| 5,944,598 | A | 8/1999 | Tong et al. |
| 5,974,925 | A | 11/1999 | Lindee et al. |
| 6,123,004 | A | 9/2000 | Matz |
| 6,129,625 | A | 10/2000 | Cate et al. |
| 6,186,059 | B1 | 2/2001 | Mello et al. |
| 6,189,059 | B1 | 2/2001 | Sotek et al. |
| 6,198,834 | B1 | 3/2001 | Belk et al. |
| 6,253,651 | B1 | 7/2001 | Bessemer |
| 6,407,818 | B1 | 6/2002 | Whitehouse |
| 6,511,370 | B1 | 1/2003 | Mello et al. |
| 6,601,499 | B1 | 8/2003 | Bifulco |
| 6,604,991 | B1 | 8/2003 | Jurs et al. |
| 6,606,927 | B1 | 8/2003 | Lisec |
| 6,692,345 | B1 | 2/2004 | Kruger |
| 6,837,030 | B2 | 1/2005 | Drebing et al. |
| 6,859,282 | B1 | 2/2005 | Weber et al. |
| 6,860,804 | B2 | 3/2005 | Kruger |
| 6,882,434 | B1 | 4/2005 | Sandberg et al. |
| 6,931,973 | B2 | 8/2005 | Kuchler |
| 6,997,089 | B2 | 2/2006 | Lindee et al. |
| 7,052,388 | B2 | 5/2006 | Houtz |
| 7,055,419 | B2 | 6/2006 | Sandberg |
| 7,156,730 | B1 | 1/2007 | Blaine |
| 7,251,537 | B1 | 7/2007 | Blaine et al. |
| 7,364,504 | B2 | 4/2008 | Gasbarro |
| 7,373,217 | B2 | 5/2008 | Young |
| 7,399,220 | B2 | 7/2008 | Kriesel et al. |
| 7,404,759 | B2 | 7/2008 | Sato |
| 7,450,247 | B2 | 11/2008 | Sandberg et al. |
| 7,452,266 | B2 | 11/2008 | Bottemiller |
| 7,500,550 | B2 | 3/2009 | Strong et al. |
| 7,621,806 | B2 | 11/2009 | Bottemiller et al. |
| 7,623,249 | B2 | 11/2009 | Sandberg et al. |
| 7,651,388 | B2 | 1/2010 | Faires et al. |
| 7,684,030 | B2 | 3/2010 | Berube et al. |
| 7,698,977 | B2 | 4/2010 | Culling |
| 7,715,935 | B2 | 5/2010 | Vogeley et al. |
| 7,747,042 | B2 | 6/2010 | Blaine |
| 7,841,264 | B2 | 11/2010 | Kim et al. |
| 7,918,718 | B2 | 4/2011 | Christensen et al. |
| 7,949,414 | B2 | 5/2011 | Blaine et al. |
| 8,016,649 | B2 | 9/2011 | Schimitzek |
| 8,025,000 | B2 | 9/2011 | Kim et al. |
| 8,096,860 | B2 | 1/2012 | Bolte et al. |
| 8,109,065 | B2 | 2/2012 | Drebing et al. |
| 8,116,554 | B2 | 2/2012 | Burton |
| 8,166,856 | B2 | 5/2012 | Kim et al. |
| 8,373,749 | B2 | 2/2013 | Burton |
| 8,404,069 | B2 | 3/2013 | Douglas |
| 8,495,938 | B2 | 7/2013 | Weber |
| 8,517,806 | B2 | 8/2013 | Fillenworth et al. |
| 8,529,321 | B2 | 9/2013 | Weber |
| 8,643,851 | B2 | 2/2014 | Weber |
| 8,651,000 | B2 | 2/2014 | Weber |
| 8,679,565 | B2 | 3/2014 | Finkowski |
| 8,683,903 | B2 | 4/2014 | Strong et al. |
| 8,688,267 | B2 | 4/2014 | Blaine et al. |
| 8,721,405 | B2 | 5/2014 | McKenna et al. |
| 8,740,541 | B2 | 6/2014 | Pryor et al. |
| 8,755,051 | B2 | 6/2014 | Thiedig |
| 8,758,099 | B2 | 6/2014 | Reifenhaeuser |
| 8,862,262 | B2 | 10/2014 | Thorsson et al. |
| 8,869,664 | B2 | 10/2014 | Eyles et al. |
| 8,892,239 | B2 | 11/2014 | Weber |
| 8,893,599 | B2 | 11/2014 | Reifenhaeuser |
| 8,968,808 | B1 | 3/2015 | Kunert et al. |
| 8,986,080 | B2 | 3/2015 | Black et al. |
| 8,997,969 | B2 | 4/2015 | Plakolm |

(56) References Cited

U.S. PATENT DOCUMENTS

| | | | |
|---|---|---|---|
| 9,061,432 | B2 | 6/2015 | Reifenhaeuser |
| 9,091,673 | B2 | 7/2015 | Fern et al. |
| 9,095,147 | B2 | 8/2015 | Hjalmarsson et al. |
| 9,198,442 | B2 | 12/2015 | Peters et al. |
| 9,247,755 | B1 | 2/2016 | Andre et al. |
| 9,272,428 | B2 | 3/2016 | Mueller et al. |
| 9,285,213 | B2 | 3/2016 | Lindee et al. |
| 9,351,498 | B2 | 5/2016 | Grimm et al. |
| 9,386,780 | B2 | 7/2016 | Soncini |
| 9,424,061 | B2 | 8/2016 | Freimuth et al. |
| 9,427,014 | B2 | 8/2016 | Graham et al. |
| 9,526,257 | B1 | 12/2016 | Farrant et al. |
| 9,538,768 | B2 | 1/2017 | Dunivan |
| 9,561,913 | B2 | 2/2017 | Briel et al. |
| 9,597,812 | B2 | 3/2017 | Schmeiser |
| 9,700,060 | B2 | 7/2017 | Inoue et al. |
| 9,737,942 | B2 | 8/2017 | Nispel |
| 9,770,838 | B2 | 9/2017 | Kim et al. |
| 9,778,651 | B2 | 10/2017 | Strong et al. |
| 9,828,185 | B1 | 11/2017 | Talken et al. |
| 9,888,696 | B2 | 2/2018 | Lindee et al. |
| 9,913,483 | B2 | 3/2018 | Vuholm et al. |
| 9,927,377 | B2 | 3/2018 | Mills |
| 9,962,782 | B2 | 5/2018 | Nispel |
| 9,999,985 | B2 | 6/2018 | Middleton et al. |
| 10,040,213 | B2 | 8/2018 | Nielsen |
| 10,065,335 | B2 | 9/2018 | Mayer et al. |
| 10,245,742 | B2 | 4/2019 | Foreman et al. |
| 10,245,745 | B2 | 4/2019 | Volkl et al. |
| 10,315,326 | B2 | 6/2019 | Achenbach et al. |
| 10,492,504 | B2 | 12/2019 | Volkl et al. |
| 10,493,648 | B2 | 12/2019 | Nakatsu |
| 10,510,204 | B2 | 12/2019 | Castellano |
| 10,538,009 | B2 | 1/2020 | Schmeiser et al. |
| 10,654,185 | B2 | 5/2020 | Blaine et al. |
| 10,661,466 | B2 | 5/2020 | Mayer et al. |
| 10,682,781 | B2 | 6/2020 | Perini |
| 10,695,931 | B2 | 6/2020 | Perini |
| 10,695,932 | B2 | 6/2020 | Burk et al. |
| 10,710,259 | B2 | 7/2020 | Völkl et al. |
| 10,759,071 | B2 | 9/2020 | Chan |
| 10,836,063 | B2 | 11/2020 | Mayer et al. |
| 10,843,362 | B2 | 11/2020 | Grasselli |
| 10,843,364 | B2 | 11/2020 | Volkl et al. |
| 10,850,416 | B2 | 12/2020 | Schmeiser et al. |
| 10,863,751 | B2 | 12/2020 | Blaine |
| 10,869,489 | B2 | 12/2020 | Blaine et al. |
| 10,875,207 | B2 | 12/2020 | Volkl et al. |
| 11,009,472 | B2 | 5/2021 | Von Keudell et al. |
| 11,014,257 | B2 | 5/2021 | Sunter et al. |
| 11,202,452 | B2 | 12/2021 | Hofmann et al. |
| 11,540,524 | B2 | 1/2023 | Lanzky et al. |
| 12,227,367 | B2 | 2/2025 | Seager et al. |
| 2001/0036807 | A1 | 11/2001 | Veldkamp et al. |
| 2002/0004366 | A1 | 1/2002 | Thorvaldsson et al. |
| 2003/0008608 | A1 | 1/2003 | Scalia et al. |
| 2004/0029514 | A1 | 2/2004 | Kruger |
| 2004/0108645 | A1 | 6/2004 | Lindelof et al. |
| 2004/0194605 | A1 | 10/2004 | Weber |
| 2004/0200365 | A1 | 10/2004 | Young |
| 2004/0231526 | A1 | 11/2004 | Childress et al. |
| 2005/0032471 | A1 | 2/2005 | Pfarr et al. |
| 2005/0085176 | A1 | 4/2005 | Houtz |
| 2005/0120844 | A1 | 6/2005 | Weber |
| 2005/0188657 | A1 | 9/2005 | Drebing et al. |
| 2005/0199111 | A1 | 9/2005 | Sandberg et al. |
| 2006/0154587 | A1 | 7/2006 | Mikkelsen et al. |
| 2006/0156878 | A1 | 7/2006 | Faires et al. |
| 2006/0162515 | A1 | 7/2006 | Vogeley et al. |
| 2006/0171581 | A1 | 8/2006 | Blaine |
| 2006/0205335 | A1 | 9/2006 | Bifulco |
| 2006/0219069 | A1 | 10/2006 | Skaar et al. |
| 2007/0028742 | A1 | 2/2007 | Mueller et al. |
| 2007/0193425 | A1 | 8/2007 | Weber |
| 2007/0202229 | A1 | 8/2007 | Nielsen |
| 2007/0264397 | A1 | 11/2007 | Mather et al. |
| 2008/0016999 | A1 | 1/2008 | Mathues et al. |
| 2008/0200107 | A1 | 8/2008 | Christensen et al. |
| 2008/0212842 | A1 | 9/2008 | Burton |
| 2008/0281461 | A1 | 11/2008 | Blaine et al. |
| 2009/0035434 | A1 | 2/2009 | Sverrisson et al. |
| 2009/0038455 | A1 | 2/2009 | Strong et al. |
| 2009/0064833 | A1 | 3/2009 | Sandberg et al. |
| 2009/0120256 | A1 | 5/2009 | Pasek |
| 2009/0137195 | A1 | 5/2009 | Bottemiller et al. |
| 2009/0246333 | A1 | 10/2009 | Groneberg et al. |
| 2009/0294246 | A1 | 12/2009 | Pogue |
| 2010/0066824 | A1 | 3/2010 | Burton |
| 2010/0116107 | A1 | 5/2010 | Spillner et al. |
| 2010/0170373 | A1 | 7/2010 | Green |
| 2010/0179684 | A1 | 7/2010 | Blaine et al. |
| 2010/0267320 | A1 | 10/2010 | Weber |
| 2010/0304652 | A1 | 12/2010 | Bolte et al. |
| 2010/0307303 | A1 | 12/2010 | Weber |
| 2011/0111682 | A1 | 5/2011 | Schimitzek |
| 2011/0126679 | A1 | 6/2011 | Weber |
| 2011/0126680 | A1 | 6/2011 | Weber |
| 2011/0150604 | A1 | 6/2011 | Marsh et al. |
| 2011/0154969 | A1 | 6/2011 | Weber |
| 2011/0179922 | A1 | 7/2011 | Weber |
| 2011/0185865 | A1 | 8/2011 | Weber |
| 2011/0203434 | A1 | 8/2011 | Reifenhaeuser |
| 2011/0247466 | A1 | 10/2011 | Weber |
| 2011/0247470 | A1 | 10/2011 | Weber |
| 2011/0265621 | A1 | 11/2011 | Schmidt |
| 2011/0311700 | A1 | 12/2011 | Shah et al. |
| 2012/0018353 | A1 | 1/2012 | McKenna et al. |
| 2012/0040597 | A1 | 2/2012 | Fern et al. |
| 2012/0060659 | A1 | 3/2012 | Weber |
| 2012/0073415 | A1 | 3/2012 | Maidel et al. |
| 2012/0115406 | A1 | 5/2012 | Fillenworth et al. |
| 2012/0137844 | A1 | 6/2012 | Weber |
| 2012/0137845 | A1 | 6/2012 | Weber |
| 2012/0198974 | A1 | 8/2012 | Weber |
| 2012/0198975 | A1 | 8/2012 | Lindee |
| 2012/0212603 | A1 | 8/2012 | Lindee et al. |
| 2013/0068076 | A1 | 3/2013 | Schmeiser et al. |
| 2013/0074667 | A1 | 3/2013 | Weber et al. |
| 2013/0133490 | A1 | 5/2013 | Schmeiser et al. |
| 2013/0260660 | A1 | 10/2013 | Reifenhaeuser |
| 2014/0174891 | A1 | 6/2014 | Mayer |
| 2014/0338509 | A1 | 11/2014 | Lindee et al. |
| 2015/0093488 | A1 | 4/2015 | Gutmann et al. |
| 2015/0122100 | A1 | 5/2015 | Schmeiser |
| 2015/0150272 | A1 | 6/2015 | Peters et al. |
| 2015/0190939 | A1 | 7/2015 | Gerlach et al. |
| 2015/0205288 | A1 | 7/2015 | Strong et al. |
| 2015/0216192 | A1 | 8/2015 | Jacobsen et al. |
| 2015/0290827 | A1 | 10/2015 | Evans et al. |
| 2015/0367523 | A1 | 12/2015 | Schmeiser et al. |
| 2016/0031110 | A1 | 2/2016 | Middleton et al. |
| 2016/0088852 | A1 | 3/2016 | Lindee et al. |
| 2016/0207152 | A1 | 7/2016 | Weber |
| 2017/0035066 | A1 | 2/2017 | Hukelmann |
| 2017/0156354 | A1 | 6/2017 | Inoue et al. |
| 2017/0196232 | A1 | 7/2017 | Vuholm et al. |
| 2017/0210023 | A1 | 7/2017 | Hocker et al. |
| 2017/0210569 | A1 | 7/2017 | Dopp et al. |
| 2017/0212506 | A1 | 7/2017 | Pfarr et al. |
| 2017/0217044 | A1 | 8/2017 | Blaine |
| 2017/0245509 | A1 | 8/2017 | Petersen et al. |
| 2017/0320225 | A1 | 11/2017 | Fox et al. |
| 2017/0368707 | A1 | 12/2017 | Keller |
| 2018/0027848 | A1 | 2/2018 | Blaine et al. |
| 2018/0029246 | A1 | 2/2018 | Blaine et al. |
| 2018/0158537 | A1 | 6/2018 | Blaine |
| 2018/0207896 | A1 | 7/2018 | Olson et al. |
| 2019/0009421 | A1 | 1/2019 | Grasselli |
| 2019/0152084 | A1 | 5/2019 | Schmeiser |
| 2020/0068908 | A1 | 3/2020 | Blaine |
| 2020/0068909 | A1 | 3/2020 | Blaine et al. |
| 2020/0108520 | A1 | 4/2020 | Pryor et al. |
| 2020/0238556 | A1 | 7/2020 | Blaine et al. |
| 2020/0269459 | A1 | 8/2020 | Fox et al. |

(56) References Cited

U.S. PATENT DOCUMENTS

2020/0315191 A1 10/2020 Hofmann et al.
2020/0338777 A1 10/2020 Beliveau et al.
2021/0001507 A1 1/2021 Zambarda
2021/0092968 A1 4/2021 Blaine
2021/0227840 A1 7/2021 Blaine
2023/0129471 A1 4/2023 Torrenga et al.
2023/0211517 A1 7/2023 Su
2024/0058981 A1 2/2024 Stachel
2024/0399602 A1 12/2024 Kamsteeg et al.

FOREIGN PATENT DOCUMENTS

AU 2013301673 B2 12/2016
AU 2012267912 B2 12/2019
CA 2039045 A1 9/1991
CA 2006994 C 9/1992
CA 2133953 A1 11/1993
CA 1328856 C 4/1994
CA 2158625 A1 3/1996
CA 2377198 A1 9/2002
CA 2200545 C 1/2003
CA 2525674 A1 12/2004
CA 2531621 A1 6/2006
CA 2531626 A1 6/2006
CA 2531857 A1 6/2006
CA 2541555 A1 10/2006
CA 2550972 A1 12/2006
CA 2664348 A1 5/2008
CA 2511654 C 6/2009
CA 2708216 A1 6/2009
CA 2767423 A1 1/2011
CA 2779326 A1 5/2011
CA 3013395 A1 5/2011
CA 2783818 A1 6/2011
CA 2738300 A1 10/2011
CA 2552307 C 1/2012
CA 2531852 C 2/2013
CA 2531863 C 2/2013
CA 2743418 C 4/2013
CA 2531895 C 8/2013
CA 2695808 C 11/2015
CA 2877448 C 10/2016
CA 2904958 A1 3/2017
CA 2706407 C 5/2017
CA 3032041 A1 2/2018
CA 2899291 C 3/2018
CA 2778724 C 9/2018
CA 3108061 A1 3/2020
CA 3032196 C 10/2020
CA 3137380 A1 11/2020
CN 105979784 A 9/2016
DE 2843388 A1 6/1979
DE 8128596 U1 3/1982
DE 3100901 A1 8/1982
DE 3544708 A1 6/1987
DE 68903375 T2 3/1993
DE 19917536 A1 10/2000
DE 10220006 A1 11/2003
DE 102004010696 A1 9/2005
DE 60305523 T2 8/2007
DE 102010011172 A1 9/2011
DE 102010021951 A1 12/2011
DE 102012107278 A1 2/2014
DE 102016003938 A1 10/2017
DE 102019110313 B3 7/2020
DK 201570224 A1 4/2015
EP 0101264 A2 2/1984
EP 0057478 B1 4/1986
EP 0332895 A2 9/1989
EP 341564 A1 11/1989
EP 0373844 A1 6/1990
EP 0449512 A1 10/1991
EP 0637278 A1 2/1995
EP 587870 B1 2/1996
EP 0377451 B1 4/1997
EP 690773 B1 2/1998
EP 1064518 A2 1/2001
EP 1174034 A1 1/2002
EP 1243386 A2 9/2002
EP 0971595 B1 2/2003
EP 1211944 B1 9/2004
EP 1429898 B1 5/2005
EP 1356906 B1 8/2005
EP 1626622 A2 2/2006
EP 1555882 B1 5/2006
EP 1289374 B1 7/2007
EP 2084968 A1 8/2009
EP 2094102 A1 9/2009
EP 1781110 B1 2/2010
EP 2210495 A1 7/2010
EP 2230920 A2 9/2010
EP 2266766 A2 12/2010
EP 1178878 B2 5/2011
EP 2352381 A2 8/2011
EP 2353391 A1 8/2011
EP 1583640 B1 10/2011
EP 1820614 B1 10/2011
EP 2258523 B1 11/2011
EP 1552912 B1 2/2012
EP 2190637 B1 2/2012
EP 2272640 B1 2/2012
EP 2452168 A1 5/2012
EP 2509454 A2 10/2012
EP 2450166 B1 11/2012
EP 2572840 A2 3/2013
EP 2572841 A2 3/2013
EP 2572842 A2 3/2013
EP 2625959 A2 8/2013
EP 2516118 B1 11/2013
EP 2664425 A2 11/2013
EP 2531038 B1 12/2013
EP 2644337 B1 3/2014
EP 1915240 B1 4/2014
EP 2029330 B1 4/2014
EP 2755018 A1 7/2014
EP 2618962 B1 8/2014
EP 2493765 B1 10/2014
EP 2809454 A1 12/2014
EP 2435220 B1 7/2015
EP 2537651 B1 10/2015
EP 2829372 B1 12/2015
EP 2341313 B1 3/2016
EP 2796255 B1 5/2016
EP 2835236 B1 6/2016
EP 3069836 A1 9/2016
EP 2359992 B2 12/2016
EP 2444213 B1 1/2017
EP 1534478 B1 3/2017
EP 2437920 B1 5/2017
EP 3170632 A1 5/2017
EP 3069835 B1 11/2017
EP 2315650 B1 12/2017
EP 3275313 A1 1/2018
EP 2439029 B1 4/2018
EP 2882296 B1 4/2018
EP 2885115 B1 4/2018
EP 3160241 B1 10/2018
EP 3386691 A1 10/2018
EP 2494307 B1 12/2018
EP 3483553 A1 5/2019
EP 3305696 B1 7/2019
EP 3224005 B1 8/2019
EP 3238898 B1 10/2019
EP 2414140 B1 11/2019
EP 1782929 B2 12/2019
EP 3578917 A1 12/2019
EP 3332928 B1 1/2020
EP 3424332 B1 1/2020
EP 3392847 B1 2/2020
EP 3689563 A1 8/2020
EP 3448643 B1 9/2020
EP 3448642 B1 10/2020
EP 2895308 B1 1/2021
EP 3760368 A1 1/2021

(56) References Cited

FOREIGN PATENT DOCUMENTS

| | | | |
|---|---|---|---|
| EP | 3490383 | B1 | 5/2021 |
| EP | 3174666 | B1 | 7/2021 |
| EP | 3843549 | A1 | 7/2021 |
| EP | 3386692 | B1 | 9/2021 |
| EP | 3888864 | A1 | 10/2021 |
| EP | 3900899 | A1 | 10/2021 |
| EP | 2844440 | B2 | 11/2021 |
| EP | 3448641 | B1 | 9/2022 |
| FR | 2737479 | A1 | 2/1997 |
| GB | 483604 | A | 4/1938 |
| GB | 2075459 | B | 6/1984 |
| GB | 2377362 | A | 1/2003 |
| GB | 2364894 | B | 11/2004 |
| JP | 2007522948 | A | 8/2007 |
| JP | 5025271 | B2 | 9/2012 |
| KR | 20100101880 | A | 9/2010 |
| KR | 101025501 | B1 | 4/2011 |
| KR | 20190005814 | A | 1/2019 |
| KR | 102018637 | B1 | 9/2019 |
| MX | 2017003541 | A | 10/2017 |
| WO | WO9322114 | A1 | 11/1993 |
| WO | WO9947885 | A2 | 9/1999 |
| WO | WO200062983 | A1 | 10/2000 |
| WO | WO0132369 | A1 | 5/2001 |
| WO | WO200328963 | A1 | 4/2003 |
| WO | WO200359585 | A2 | 7/2003 |
| WO | WO2004105519 | A2 | 12/2004 |
| WO | WO2004106020 | A1 | 12/2004 |
| WO | WO2006080033 | A1 | 8/2006 |
| WO | WO2006136814 | A1 | 12/2006 |
| WO | WO2007022782 | A2 | 3/2007 |
| WO | WO2007096363 | A1 | 8/2007 |
| WO | WO2008057732 | A1 | 5/2008 |
| WO | WO2009079173 | A2 | 6/2009 |
| WO | WO2010054332 | A2 | 5/2010 |
| WO | WO2011072187 | A2 | 6/2011 |
| WO | WO2012161577 | A1 | 11/2012 |
| WO | WO2013113518 | A1 | 8/2013 |
| WO | WO2013135264 | A1 | 9/2013 |
| WO | WO2013148322 | A1 | 10/2013 |
| WO | WO2014023626 | A2 | 2/2014 |
| WO | WO201460340 | A1 | 4/2014 |
| WO | WO2015092935 | A1 | 6/2015 |
| WO | WO2015114118 | A1 | 8/2015 |
| WO | WO2015193507 | A1 | 12/2015 |
| WO | WO2016045683 | A1 | 3/2016 |
| WO | WO2017133972 | A1 | 8/2017 |
| WO | WO2017186826 | A1 | 11/2017 |
| WO | WO2018111108 | A2 | 6/2018 |
| WO | WO2020046868 | A1 | 3/2020 |
| WO | WO2020212246 | A1 | 10/2020 |
| WO | WO2020225529 | A1 | 11/2020 |

OTHER PUBLICATIONS

International Search Report and Written Opinion for PCT/US2022/047623 mailed dated Apr. 17, 2023, 58 pages.

BLADE ASSEMBLY AND COUNTERWEIGHT MECHANISM FOR A HIGH-SPEED FOOD SLICING APPARATUS, AND METHODS ASSOCIATED WITH THE SAME

CROSS-REFERENCE TO RELATED APPLICATION

This application claims the priority of U.S. provisional application Ser. No. 63/271,459, filed on Oct. 25, 2021, the contents of which are incorporated herein in its entirety.

FIELD OF THE INVENTION

The present disclosure generally relates to an apparatus for slicing food products using a rotating blade, such as an involute blade, which is mounted on a hub and requires counterbalancing.

BACKGROUND

The present disclosure generally relates to an apparatus for slicing food products using a rotating blade, such as an involute blade. Blades of slicing machines are heavy, extremely sharp and dangerous to handle without proper safety practices. Slicing blades are mounted to and fixedly attached to a mounting assembly, such as a hub. Due to the geometry of involute blades, one side is heavier than the other. Accordingly, such blades must be balanced to permit high-speed rotation. In known equipment, a counterweight is added directly to the blade. In other equipment, the counterweight is added to the mounting assembly and requires removal and adjustment.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

SUMMARY

Figure 1:
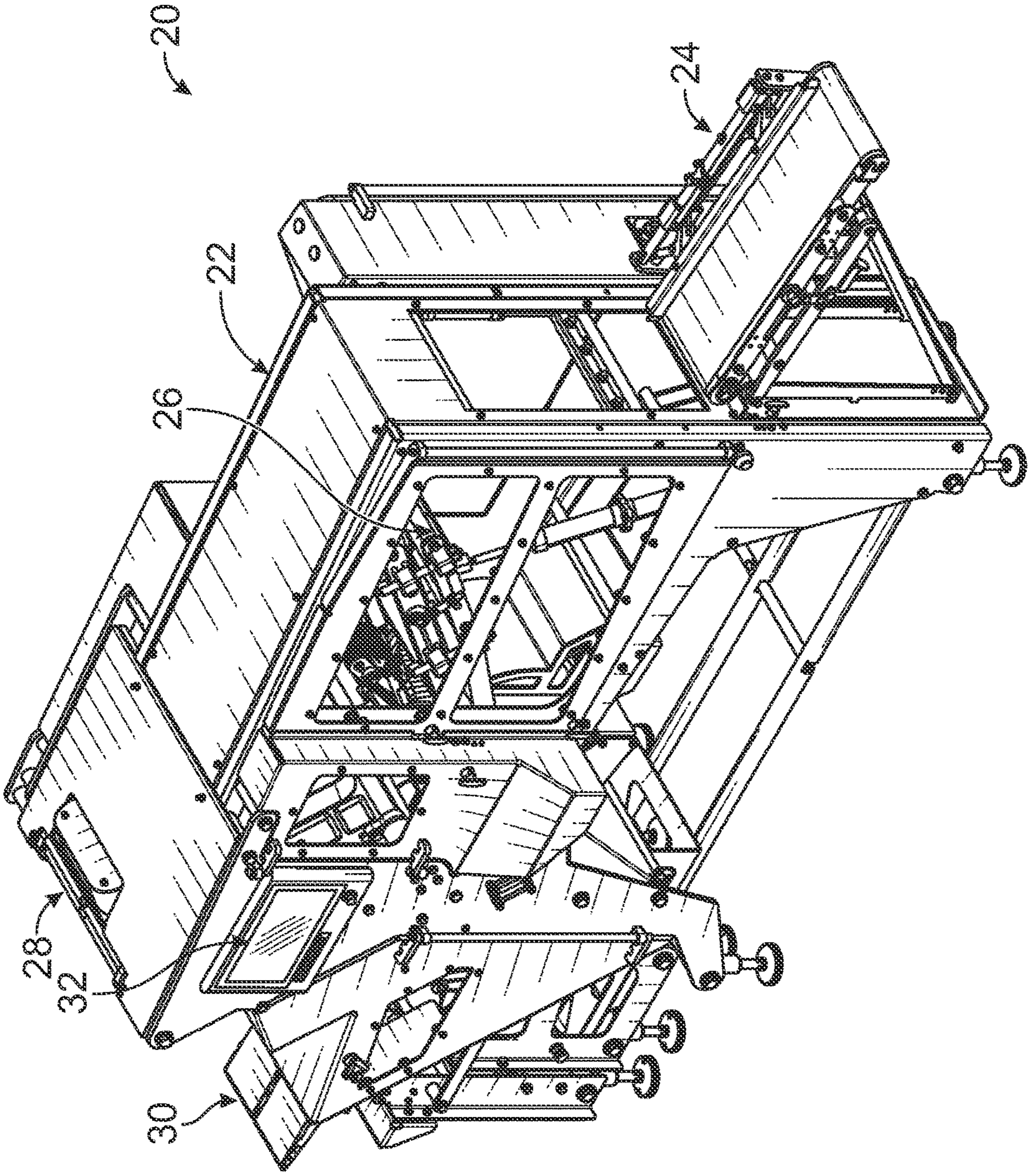
FIG. 1 is a perspective view of a food product slicing machine generally, according to one embodiment.
Figure 2:
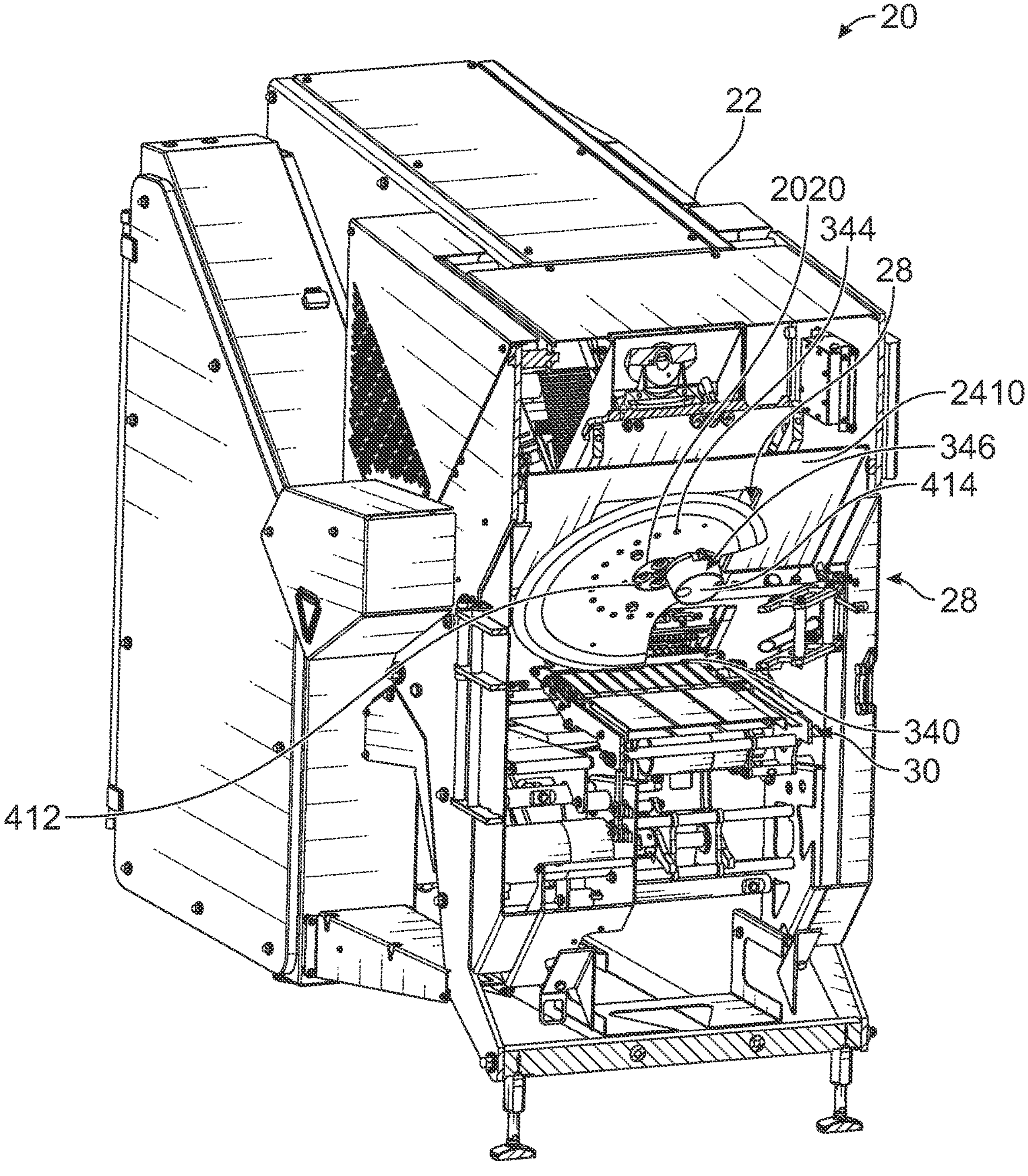
FIG. 2 is a perspective view of the food product slicing machine of FIG. 1, particularly showing the slicing blade and mount, according to one embodiment.
Figure 3:
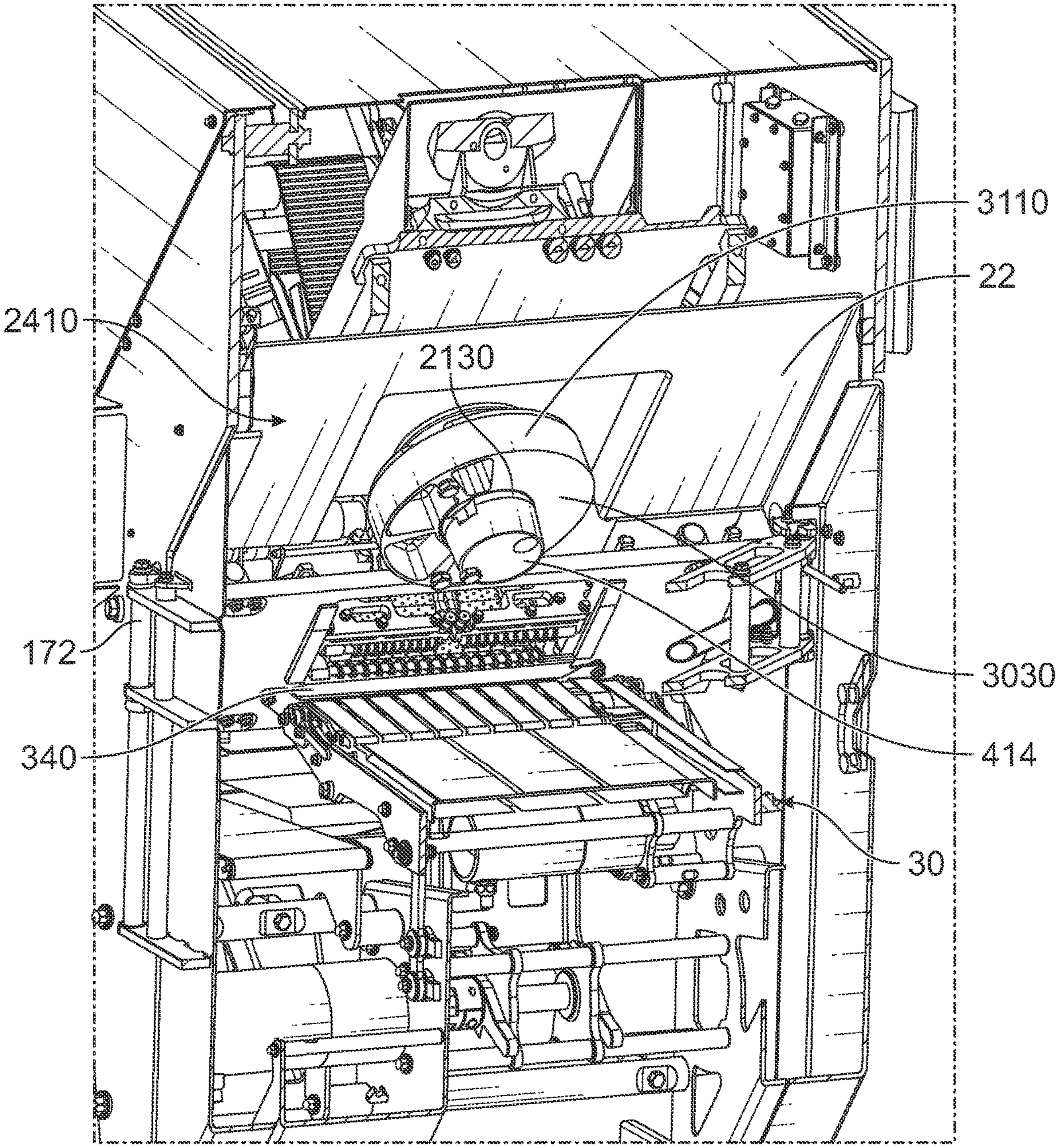
FIG. 3 is a perspective view of the food product slicing machine of FIG. 1, particularly showing the blade mount, according to one embodiment.
Figure 4:
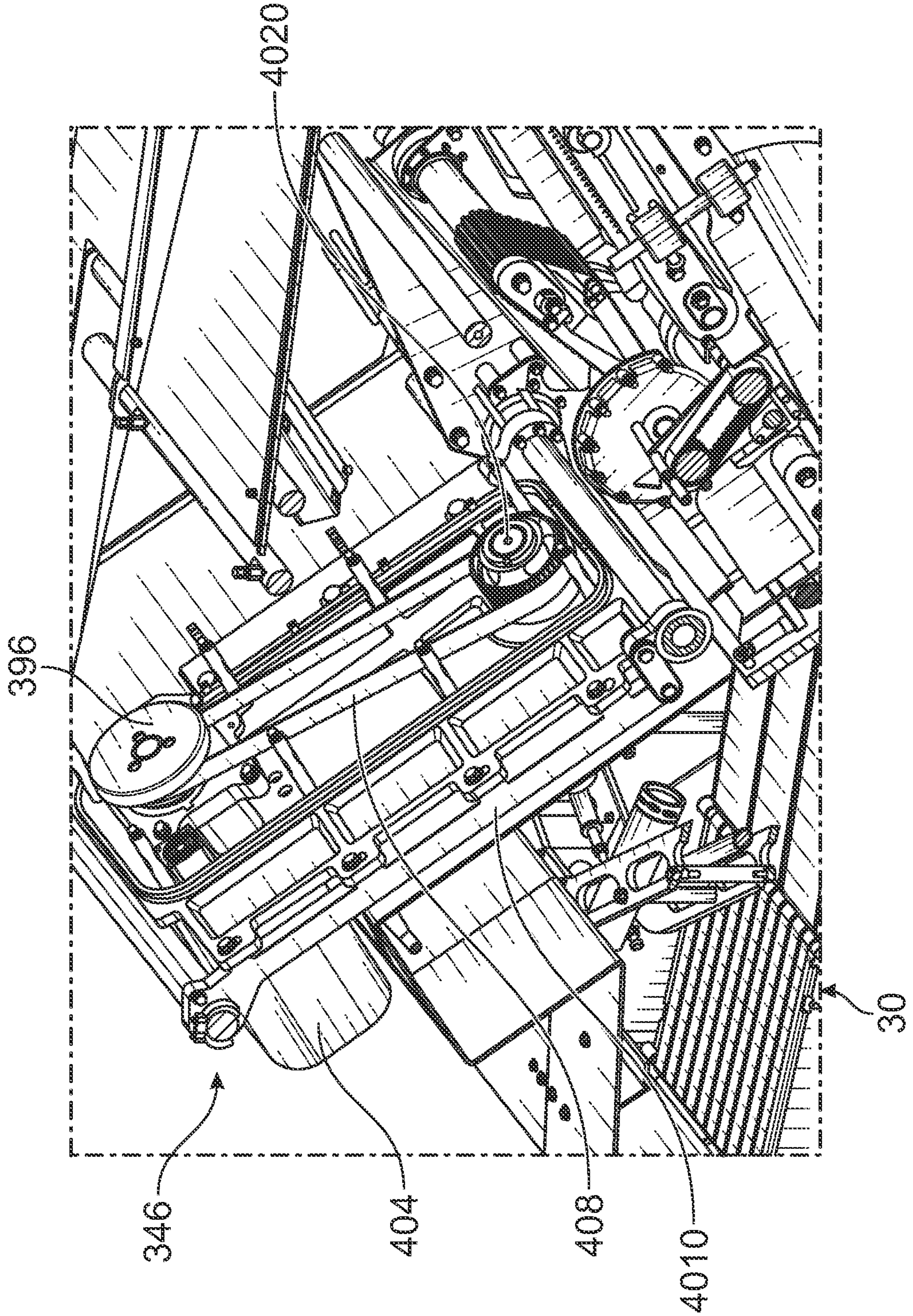
FIG. 4 is a perspective view of the food product slicing machine of FIG. 1, particularly showing a driven side of the blade mount, according to one embodiment.
Figure 5:
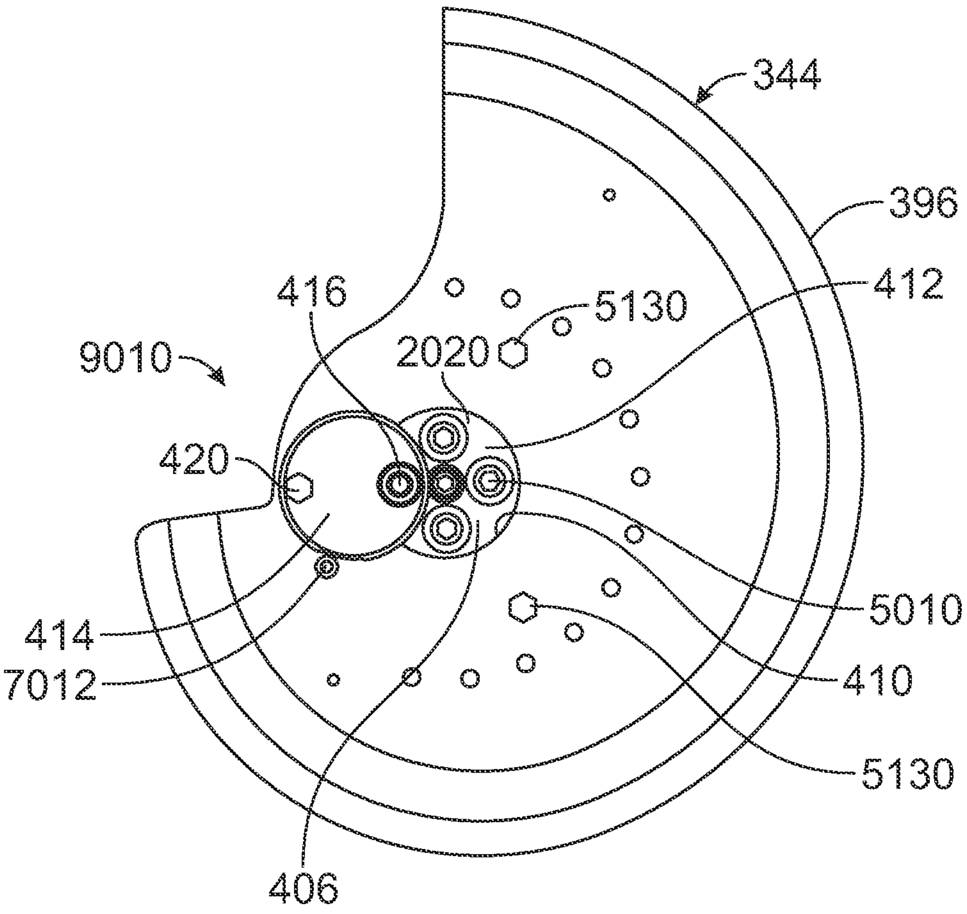
FIG. 5 is a front view of the blade of the food product slicing machine of FIG. 1, according to one embodiment.

A food slicing system for a high-speed food slicing machine includes an involute blade configured for rotation about a rotational axis, and having a central mounting aperture, a motor operatively coupled to a slicing assembly frame an configured to rotate a drive shaft, and a hub fixedly secured to a distal end of the drive shaft and configured to rotate with the drive shaft. The hub has a central pilot projection coaxial with the drive shaft, and a flat, blade contacting surface surrounding the pilot projection, where the pilot projection is configured to be received through the mounting aperture of the blade, to center the blade on the hub. A counterweight mounted to the hub is rotatable between a first position and an second position relative to the hub. When the counterweight is in the first position, the counterweight is in axial alignment with pilot projection, and permits the blade to be attached to or removed from the hub via movement of the blade in the axial direction and in a plane substantially parallel to a plane of the blade contacting surface. When the counterweight is in the second position, the counterweight is eccentric to the pilot projection and is offset from the axis of rotation, to provide a predetermined amount of weight offset from the axis of rotation to counterbalance the weight of the blade.

DETAILED DESCRIPTION

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Referring now to FIGS. 1-6, a food product slicing apparatus 20 is used to slice food products into slices. The food products may include a wide variety of edible materials including, but not limited to meat, such as pork bellies, beef, chicken, fish, etc., and cheese.

The food product slicing apparatus 20 includes a main frame 22, a load assembly 24 mounted on the main frame 22, a feed assembly 26 mounted on the main frame 22 downstream of the load assembly 24, a slicing assembly 28 mounted on the main frame 22 downstream of the feed assembly 26, and an output assembly 30 mounted on the main frame 22 downstream of the slicing assembly 28. The food product slicing apparatus 20 further includes a control system 32 configured to control operation of the components of the food product slicing apparatus 20.

The main frame 22 supports the load assembly 24, the feed assembly 26, the slicing assembly 28, and the output assembly 30 on a ground surface, and includes various mechanisms and power systems for powering the food product slicing apparatus 20. The load assembly 24 and the feed assembly 26 are configured to support and handle the food products and to move the food products to the slicing assembly 28. The slicing assembly 28 is configured to slice the food products into individual slices. The sliced food product is supported on the output assembly 30, which may be a conveyor, in stacks or in shingles and is moved away from the slicing assembly 28. The control system 32 includes all the necessary hardware and software to perform all of the operations and functions of the food product slicing apparatus 20. The control system 32 may be mounted on the main frame 22 or may be remote from the main frame 22.

The slicing assembly 28 includes a shear bar 340, a food product gripping assembly (not shown) on the shear bar 340 (FIG. 3) that cooperates with the feed roller 172 (FIG. 3) on the feed assembly 26, a slicing blade 344 for cutting the food products into slices, and a blade retract and driving system 346 (FIG. 4) for mounting the slicing blade 344 on the main frame 22 and rotating the slicing blade 344. The shear bar 340 and the food product gripping assembly 342 are downstream of the drive assembly 106. The slicing blade 344 is downstream of the shear bar 340. The feed roller 172 and the food product gripping assembly 342 grip the food products as the food products are being sliced by the slicing blade 344.

Referring now to FIGS. 2-9, a blade counterweight mechanism 2410 is described. The blade 344, which is preferably an involute blade, may be mounted on a hub 3110. The hub 3110, in turn, is driven by a motor 404 operatively coupled to the slicing assembly frame 4010. The motor 404 may directly drive a shaft 4020 of the hub 3110, or may indirectly drive the shaft 4020 of the hub 3110 by a belt 408 and/or pulley 396 arrangement, according to a preferred embodiment.

The hub 3110 is fixedly secured to a distal end of the drive shaft 4020 and configured to rotate with the drive shaft 4020. The hub 3110 includes a central pilot projection 3120, which is coaxial with the drive shaft 4020. The pilot projection 3120 may be a separate disk-like component fastened to the hub 3110 with a plurality of bolts 5010, or may be integrally formed with the hub 3110. The pilot projection 3120 may be elevated above the surface 3030 of the hub 3110, which hub surface 3030 forms a flat, blade contacting surface 3030, that surrounds the pilot projection 3120.

The pilot projection 3120 is configured to be received through the mounting aperture 2020 of the blade 344 so as to center the blade 344 on the hub 3110. The pilot projection 3120 projects above a surface of the hub 3110 by a distance less than or equal to a thickness of the blade 344 as measured at the mounting aperture 2020 of the blade 344.

Figure 6:
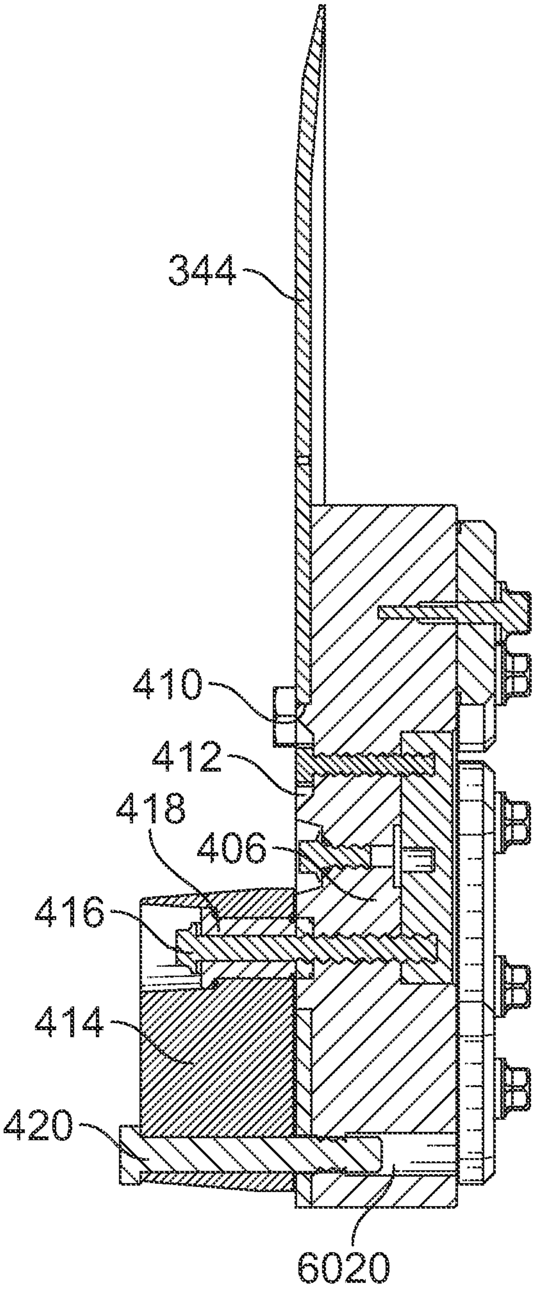
FIG. 6 is a side view of the blade and hub, according to one embodiment.
Figure 7:
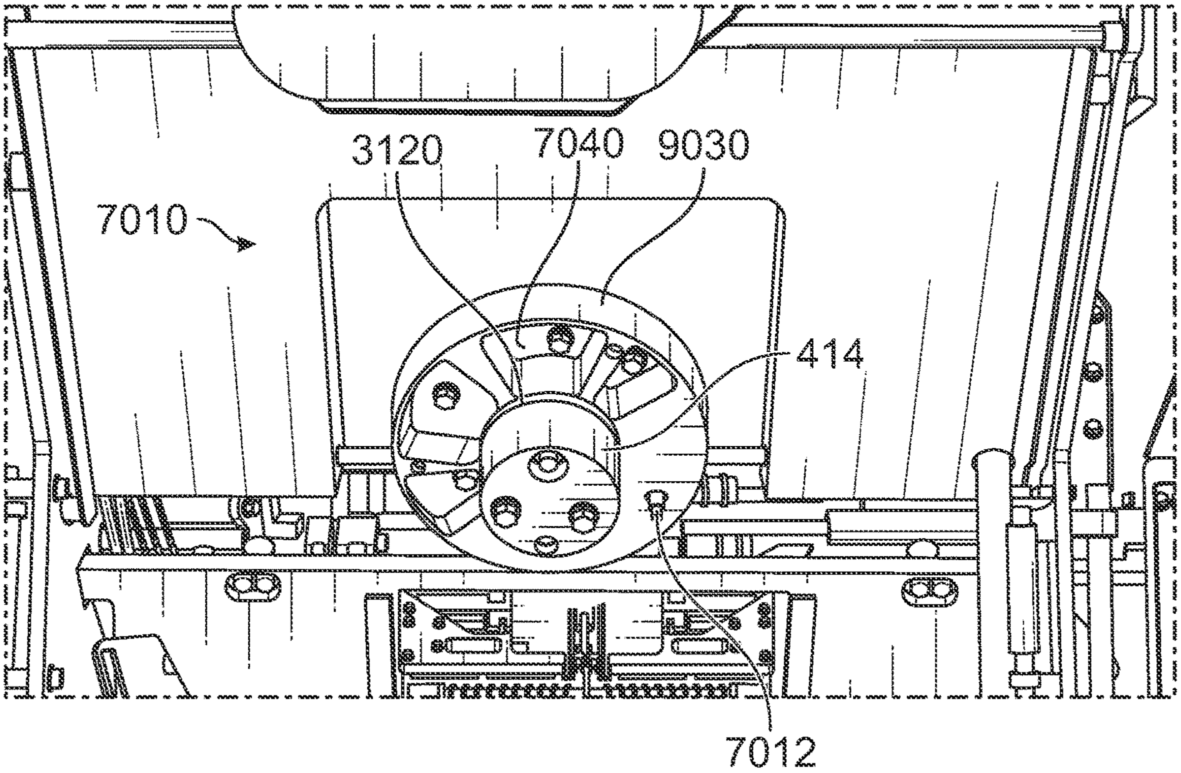
FIG. 7 is a perspective view of the hub with the counterweight in the first position, according to one embodiment.

As best shown in FIG. 6, the blade counterweight mechanism 2410 further includes a rotatable weight or counterweight 414 eccentrically mounted to the pilot projection 3120 by a bolt or pivot pin 416 and which extends through a portion of the rotatable counterweight 414. An inner race of a bearing 418 is affixed to the pivot pin 416 and an outer race of the bearing 418 is affixed to the rotatable weight 414. The rotatable counterweight 414 can rotate relative to the hub 3110 about the pivot pin 416 via the bearing 418.

The rotatable counterweight 414 may be rotated between a first position 7010 and a second position 2410. When the counterweight 414 is in the first position 7010, the counterweight 414 is in axial alignment with pilot projection 3120. In this position, the blade 344 may be attached to or removed from the hub 3110 via movement of the blade 344 in the axial direction and in a plane parallel to a plane of the blade contacting surface 3030. Essentially, the blade 344 may be removed from the hub 3110 or a new blade may be attached to the hub 3110 via axial movement of the blade 344, while maintaining the blade in the same plane as the surface of the hub 3110. This may be performed for blade replacement or servicing.

Figure 8:
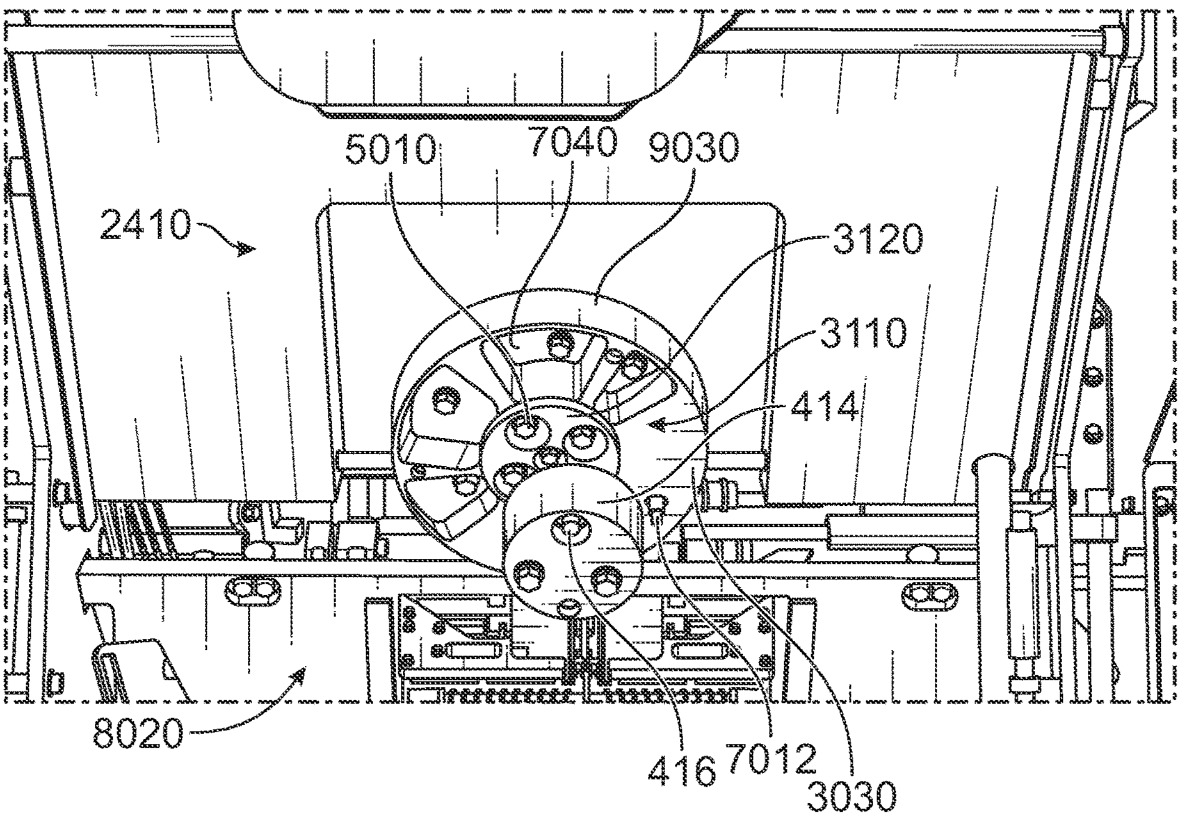
FIG. 8 is a perspective view of the hub with the counterweight in the temporary position, according to one embodiment.

While the counterweight 414 is in the first position 7010, in operation, a new blade is then affixed to the hub 3110. Once the mounting aperture 2020 of the new blade has been positioned over the pilot projection 3120 and the blade body is in contact with the blade contacting surface 3030 of the hub 3110, the counterweight 414 may be permitted to temporarily hang downwardly 8020 and freely pivot about the pivot pin 416 under the force of gravity, as shown in FIG. 8, with blade omitted for clarity. This temporary position 8020 of the counterweight 414 provides a mechanism to temporarily hold the blade 344 in place, in a non-operational manner. The blade 344 may then be fixedly mounted to the hub 3110 using a plurality of bolts 5130 spaced evenly about a circumference of the mounting aperture 2020 of the blade 344, and where the plurality of bolts 5130 are displaced radially outwardly from a perimeter of the mounting aperture 2020.

Figure 9:
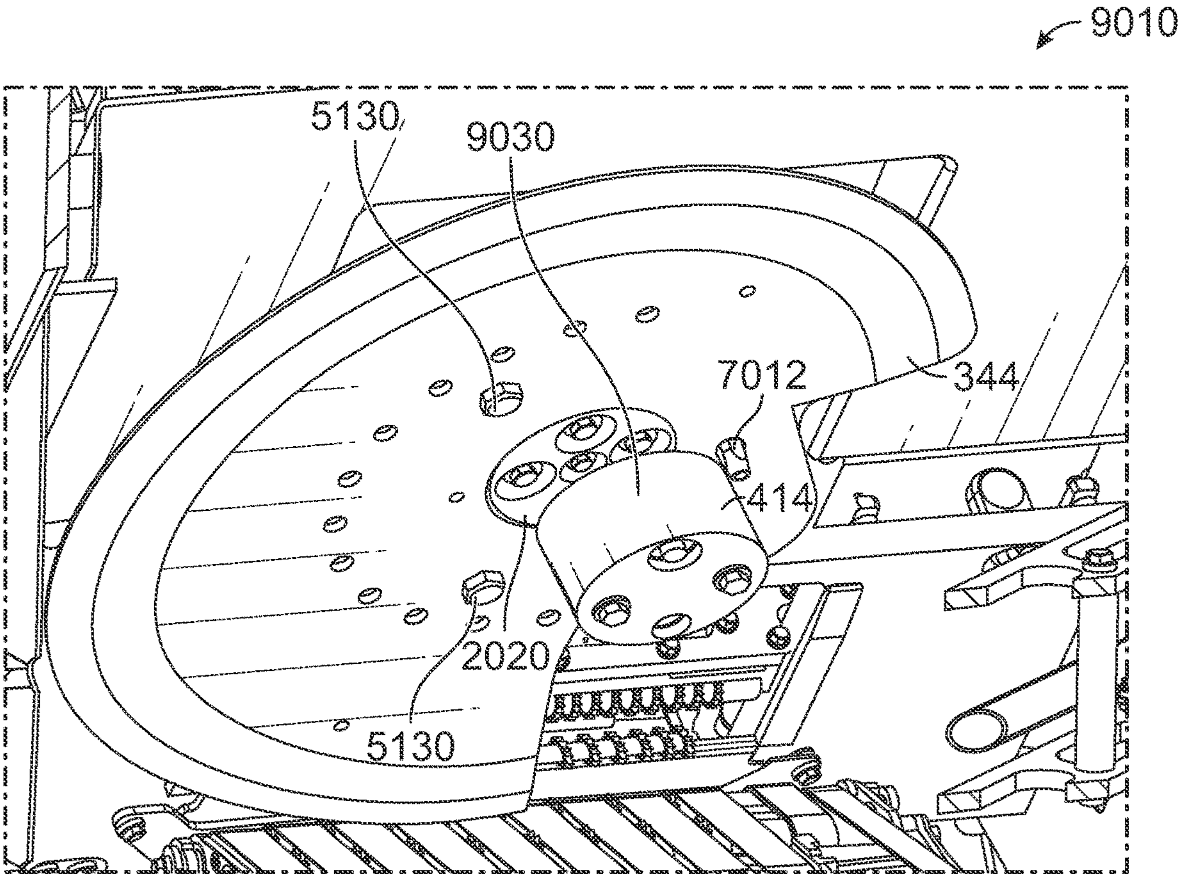
FIG. 9 is a perspective view of the hub and mounted blade, with the counterweight in the second position, according to one embodiment.

Once the blade 344 has been securely bolted to the hub 3110, as shown in FIG. 9, the rotatable counterweight 414 may be rotated from the first position 7010 to the second position 2410 by rotating the counterweight 414 in the clockwise direction about the pivot pin 416 until an outer wall 9030 of the counterweight 414 contacts a stop pin 7012, which projects from the blade contacting surface 3030.

When the counterweight 414 is in the second position 2410 stopped in place by the stop pin 7012, a locking bolt 420 is inserted through a through bore 6020 in the counterweight 414, and the end of the locking bolt 420 is received within a corresponding threaded aperture in the pilot projection 3120. In this position, the locking bolt 420 is tightened so as to "sandwich" the blade 344 between the blade contacting surface 3030 of the hub 3110 and an inner surface of the counterweight 414. The locking bolt 420 may be completely removeable, or may be partially held in place by a grommet to avoid dropping or losing the locking bolt.

It is important to note that whether in the first position 7010 or in the second position 2410, the counterweight 414 is not detachable from the hub 3110, and always remains attached to the hub 3110, although rotatable relative thereto. Thus, removal and attachment of the blade 344 may be performed without the need to remove the counterweight 414. Accordingly, the counterweight 414 remains rotatably attached to the hub 3110 while the blade 344 is removed from the hub 3110, and remains rotatably attached to the hub 3110 while the blade 344 is secured to the hub 3110. This increases safety and convenience, while reducing the time required to change or service the blade 344.

The angular position of the counterweight 414 relative to the hub 3110, as dictated by placement of the locking bolt 420 determines the balancing effect of the counterweight 414 as the hub 3110 and blade 344 rotate. Due to the angular offset of the counterweight 414 relative to the axis of rotation, the center of mass of the counterweight 414 counterbalances the weight of the involute blade 344, as the weight of the involute blade is greater at one end than the other, due to its spiral shape.

In another embodiment, the hub 3110 may include cut-out areas 7040 where material is removed or has been omitted to provide further counterbalance and torque control of the hub 3110. As shown in the figures, one or more cutout portions 7040 may be formed in the body of the hub 3110 about a semicircular portion of the hub 3110, which is preferably located at a side of the hub 3110 away located from the counterweight. In this embodiment, because a predetermined of mass is removed from one portion of the hub 3110 which is countered by the counterbalance 414, the torque about the drive shaft is equalized to prevent wobble.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. A food slicing system for a high-speed food slicing machine, comprising:

- an involute blade configured for rotation about a rotational axis, and having a central mounting aperture;
- a motor operatively coupled to a slicing assembly frame and configured to rotate a drive shaft;
- a hub fixedly secured to a distal end of the drive shaft and configured to rotate with the drive shaft;
- the hub having a central pilot projection coaxial with the drive shaft, and having a flat, blade contacting surface surrounding the pilot projection, wherein the pilot projection is configured to be received through the mounting aperture of the blade, to center the blade on the hub;
- a counterweight mounted to the hub and rotatable between a first position and a second position relative to the hub;
- wherein when the counterweight is in the first position, the counterweight is in axial alignment with pilot projection, and permits the blade to be attached to or removed from the hub via movement of the blade in an axial direction and in a plane substantially parallel to a plane of the blade contacting surface; and
- wherein when the counterweight is in the second position, the counterweight is eccentric to the pilot projection and is offset from the rotational axis, to provide a predetermined amount of weight offset from the rotational axis to counterbalance the weight of the blade.

2. The food slicing system according to claim 1, wherein the pilot projection is a separate disk-like component and is fastened to a portion of the hub.

3. The food slicing system according to claim 1, wherein the pilot projection is integrally formed with the hub.

4. The food slicing system according to claim 1, wherein the pilot projection projects above a surface of the hub by a distance less than or equal to a thickness of the blade at the mounting aperture of the blade.

5. The food slicing system according to claim 1, wherein the hub includes cut-out areas where material is removed to provide further counterbalance and torque control of the hub.

6. The food slicing system according to claim 1, wherein the counterweight remains rotatably attached to the hub in the first position while the blade is removed from the hub, and remains rotatably attached to the hub in the second position while the blade is secured to the hub.

7. The food slicing system according to claim 1, wherein the counterweight remains rotatably attached to the hub at all times during removal and installation of the blade on the hub.

8. The food slicing system according to claim 1, wherein the blade is fastened to the hub by a plurality of bolts spaced evenly about a circumference of the mounting aperture of the blade, and wherein the plurality of bolts are displaced radially outwardly from a perimeter of the mounting aperture of the blade.

9. The food slicing system according to claim 1, wherein when the counterweight is in the second position and the blade is disposed between the blade contacting surface of the hub and an inner surface of the counterweight, a counterweight fixing bolt urges the counterweight toward the hub to fixedly secure the blade between the hub and the counterweight.

10. A food slicing system for a high-speed food slicing machine having an involute blade configured for rotation about a rotational axis and a motor configured to drive a drive shaft, the food slicing system comprising:

- a hub fixedly secured to a distal end of the drive shaft and configured to rotate with the drive shaft, the hub having a central pilot projection coaxial with the drive shaft, and having a blade contacting surface surrounding the pilot projection, wherein the pilot projection is configured to be received through a mounting aperture of the blade, to center the blade on the hub;
- a counterweight mounted to the hub and rotatable between a first position and a second position relative to the hub;
- wherein when the counterweight is in the first position, the counterweight is in axial alignment with pilot projection, and permits the blade to be attached to or removed from the hub via movement of the blade in an axial direction and in a plane parallel to a plane of the blade contacting surface; and
- wherein when the counterweight is in the second position, the counterweight is eccentric to the pilot projection and is offset from the rotational axis, to provide a predetermined amount of weight offset from the rotational axis to counterbalance the weight of the blade.

11. The food slicing system according to claim 10, wherein the pilot projection is a separate disk-like component and is fastened to a surface portion of the hub or is integrally formed with the hub.

12. The food slicing system according to claim 10, wherein the pilot projection projects above a surface of the hub by a distance less than or equal to a thickness of the blade at the mounting aperture of the blade.

13. The food slicing system according to claim 10, wherein the hub includes cut-out areas where material is removed to provide further counterbalance and torque control of the hub.

14. The food slicing system according to claim 10, wherein the counterweight remains rotatably attached to the hub while the blade is removed from the hub, and remains rotatably attached to the hub while the blade is secured to the hub.

15. The food slicing system according to claim 10, wherein the counterweight remains rotatably attached to the hub at all times during removal and installation of the blade on the hub.

16. The food slicing system according to claim 10, wherein the blade is fastened to the hub by a plurality of bolts spaced evenly about a circumference of the mounting aperture of the blade, and wherein the plurality of bolts are displaced radially outwardly from a perimeter of the mounting aperture of the blade.

17. The food slicing system according to claim 10, wherein when the counterweight is in the second position and the blade is disposed between the blade contacting surface of the hub and an inner surface of the counterweight, a counterweight fixing bolt urges the counterweight toward the hub to fixedly secure the blade between the hub and the counterweight.

18. A method of balancing an involute blade in a food slicing system for a high-speed food slicing machine, the involute blade configured for rotation about a rotational axis, the high-speed food slicing machine having a motor configured to drive a drive shaft, the method comprising:

fixedly securing a hub to a distal end of the drive shaft;

providing a central pilot projection on the hub coaxial with the drive shaft, and providing a blade contacting surface surrounding the pilot projection;

pivotally mounting a counterweight to the hub to permit the hub to rotate about a pivot point, between a first position and an second position relative to the hub;

removing the blade from the hub when the counterweight is in the first position, via movement of the blade in an axial direction and in a plane parallel to a plane of the blade contacting surface, wherein the counterweight is in axial alignment with pilot projection in the first position;

attaching a new blade to the hub when the counterweight is in the first position so that the pilot projection is received within a central mounting aperture of the new blade;

rotating the counterweight from the first position to the second position so that the counterweight is eccentric to the pilot projection and is offset from the rotational axis, wherein the blade is disposed between the blade contacting surface of the hub and an inner surface of the counterweight; and tightening a fixing bolt to fixedly secure the counterweight to the hub and to secure the blade between the hub and the counterweight.

* * * * *